United States Patent [19]
Dorma

[11] 3,722,326
[45] Mar. 27, 1973

[54] VARIABLE SPEED TRANSMISSION

[76] Inventor: Edward Dorma, 4333 Grimes Avenue, N., Minneapolis, Minn. 55422

[22] Filed: June 10, 1971

[21] Appl. No.: 151,695

[52] U.S. Cl. .............................................. 74/752 B
[51] Int. Cl. ................................................ F16h 5/42
[58] Field of Search ................................... 74/752 B

[56] References Cited

UNITED STATES PATENTS

| | | |
|---|---|---|
| 1,909,191 | 5/1931 | Stafford ............................ 74/752 B |
| 1,978,416 | 10/1934 | Dodge .............................. 74/752 B |
| 2,022,058 | 11/1935 | Steuber ............................ 74/752 B |

Primary Examiner—C. J. Husar
Attorney—Burd, Braddock & Bartz

[57] ABSTRACT

A variable speed transmission having an input drive shaft and an output drive shaft operatively coupled to an eccentrically movable and rotatable structure. A manual or automatic control arrangement connects the input drive shaft to the eccentrically movable and rotatable structure to change the eccentric position of the structure relative to the axis of rotation of the input drive shaft. A drive structure, including one-way drive units, drivably couples the eccentrically movable structure with the output drive shaft. The eccentric or nutating movement of the eccentrically movable means operates the one-way drive units to rotate the output drive shaft.

26 Claims, 13 Drawing Figures

INVENTOR.
EDWARD DORMA
BY
Burd, Braddock & Bartz
ATTORNEYS

INVENTOR.
EDWARD DORMA
BY
Burd, Braddock & Bartz
ATTORNEYS

3,722,326

VARIABLE SPEED TRANSMISSION

BACKGROUND OF THE INVENTION

Belt drives in combination with centrifugal clutches and torque sensing devices are used to couple internal combustion engines to driven units, as endless driving tracks. In some drive systems a torque sensing device decouples the engine below a given low rpm, thus cutting the power to the driven unit. In these drive systems, when the drive unit is subjected to hard accelerations, the drive belt slips and the engine speed is drastically reduced, thereby reducing the effectiveness of the entire power system. Variable speed transmissions, as shown in U. S. Pat. Nos. 3,087,355 and No. 3,229,549, utilize gear trains that have axes of rotation movable relative to each other to vary the output speed of the transmissions. These types of transmissions would obviate some of the disadvantages of the belt and gear drive transmissions.

SUMMARY OF THE INVENTION

The invention is directed to a variable speed transmission having an infinitely variable output speed ratio. The transmission is a compact, self-contained gear train unit having a control means operable either manually or automatically to vary the output speed ratio of the transmission. In one form of the invention, the transmission has an automatic control that is operable to adjust, without outside or manual means, to an infinite drive ratio below a given speed and will adjust the drive ratio to maintain a range of engine speed while under significant loads. The transmission has an eccentrically movable and rotatable means which can be positioned transversely of the axis of rotation of the input drive means. A control means connects the eccentrically movable means with the input drive means. The control means is operable to vary the eccentric position of the eccentrically movable and rotatable means. A power transmitting means drivably couples the eccentrically movable means with the output drive means. The power transmitting means includes one-way drive units operable in response to eccentric or nutating motion to rotate the output drive means. The power transmitting means operates at a drive ratio dependent on the eccentric position of the eccentrically movable and rotatable means relative to the axis of rotation of the input drive means.

An object of the invention is to provide a transmission having an infinitely variable output speed ratio starting from zero that does not use clutches, brakes or belt and pulley drives.

A further object of the invention is to provide a transmission having a relatively high efficiency, smooth operating characteristics, and relatively low production costs.

Another object of the invention is to provide a transmission that will automatically adjust to an infinite drive ratio below a given driven speed and that will adjust the drive ratio to maintain a range of engine speed while under significant loads.

Figure 1:
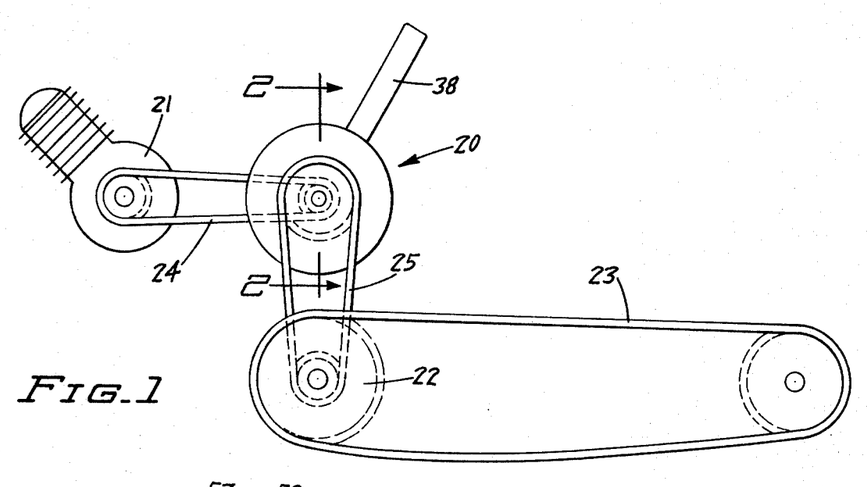
FIG. 1 is a schematic view of a power system including the variable speed transmission of the invention.

Referring to the drawings, there is shown in FIG. 1 the transmission of the invention, indicated generally at 20, located in a power train to connect an internal combustion engine 21 to a drive sprocket 22 for a track assembly 23. Engine 21 is illustrated as a two-cycle internal combustion engine that is drivably connected with the transmission 20 with a drive mechanism 24, as a chain and sprocket assembly. Power from the transmission 20 is directed to the belt or track assembly 23 with a drive mechanism 25, as a chain and sprocket assembly. The transmission 20 can be connected to other power receiving devices or machines. The track assembly 23 is but one example of a power receiving device usable with transmission 20. The maximum torque efficiency of the two-cycle internal combustion engine 21 is attained at an engine speed of between 5,500 and 6,500 rpm. The transmission 20 is controllable to maintain this engine speed under varying load conditions. The transmission 20 is also controllable to have an infinitely variable speed ratio from zero to direct drive. In one form of the transmission, a manual control is used to to change the speed ratio of the transmission. In a second form of the transmission, an automatic control is used to automatically control the transmission to infinite ratio below a given engine rpm and to adjust the ratio to maintain the engine speed in the 5,000–6,000 rpm range.

Figure 2:
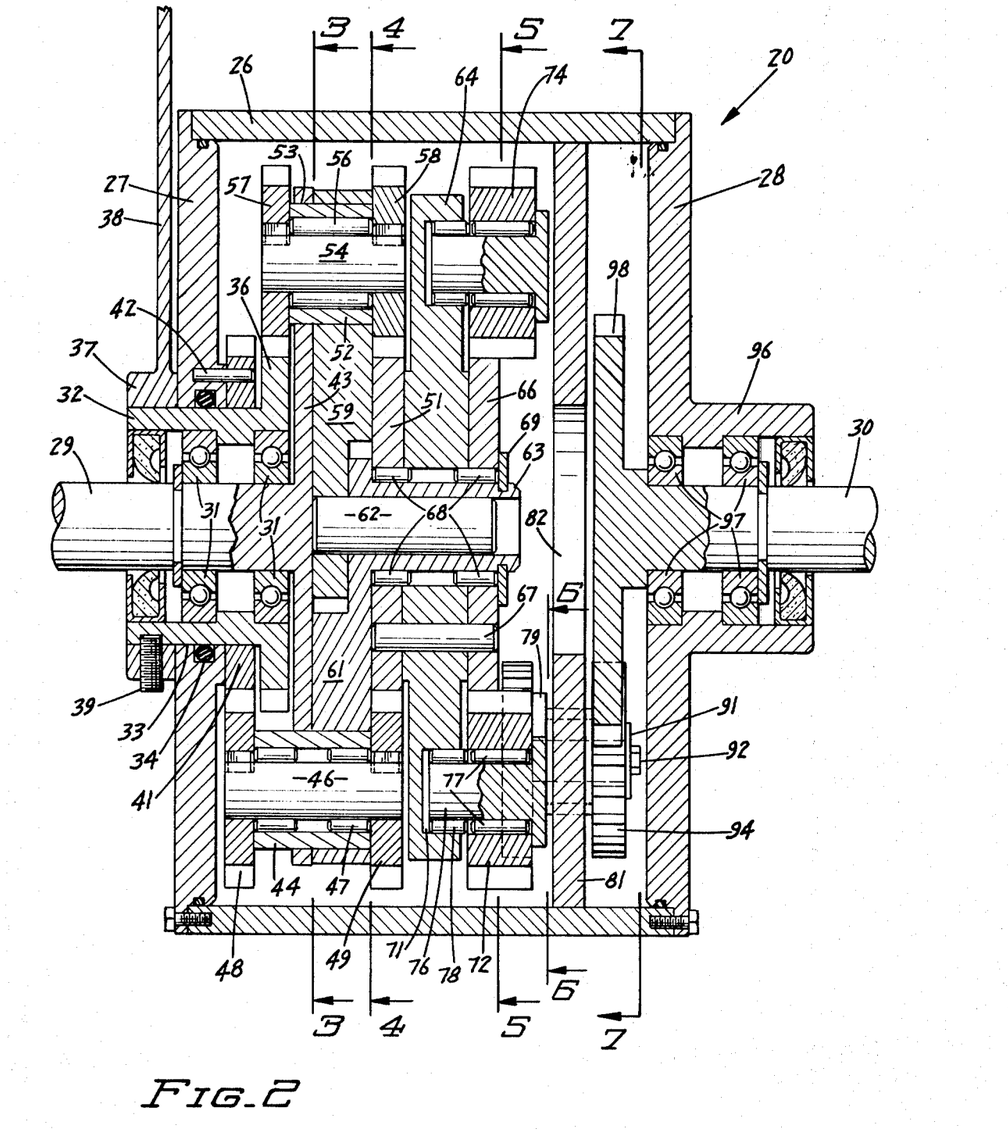
FIG. 2 is an enlarged sectional view taken along the line 2—2 of FIG. 1.

Referring to FIG. 2, transmission 20 has a cylindrical casing or housing 26 secured to an input end plate 27 and an output end plate 28. An input shaft 29 extends through a central part of the input end plate 27. Axially aligned with the input shaft 29 is an output shaft 30 extended through the center portion of the output end plate 28. Bearings 31 rotatably mount the input shaft 29 on a cylindrical collar 32. The collar 32 projects through an opening 33 in the end plate 27 and is rotatably mounted on the end plate. A seal 34 is disposed between a portion of the end plate 27 and the outer surface of the collar 32. A control external spur gear 36 is secured to the inner portion of the collar 32. Mounted on the outer portion of collar 32 is a ring 37 having an outwardly directed control handle 38. A set screw 39, threaded into a suitable hole in the ring 37, fixes the ring on the collar 32 so that movement of the handle 38 will cause rotation of the collar 32 along with the control spur gear 36.

Positioned concentrically about the collar 32 between the control spur gear 36 and the input end plate 27 is a reference external spur gear 41. A pin 42 secures the gear 41 to the input end plate 27, thereby holding the gear 41 in a fixed or stationary position. The reference spur gear 41 is identical in size and diameter to the control spur gear 36.

Secured to the inner end of the input shaft 29 is a disc 43 carrying a first transverse sleeve 44. Rotatably disposed in sleeve 44 is a transverse shaft 46. Bearings 47 rotatably mount the shaft in the sleeve 44. A spur gear 48 in driving engagement with the reference spur gear 41 is mounted on and keyed to one end of the shaft 46. A gear 49, similar to gear 48, is mounted on and keyed to the opposite end of shaft 46. Gear 49 is in driving engagement with a sun or spur gear 51.

Located substantially diametrically opposite sleeve 44 is a second transverse sleeve 52 projected through an arcuate slot 53 in the plate 43. The slot 53 has an arcuate length of approximately 30° and functions to guide and limit the movement of the sleeve 52 relative to the disc 43. Rotatably disposed within sleeve 52 is a transverse shaft 54. Bearings 56 rotatably mount the shaft 54 within the sleeve 52. A gear 57, in driving relation with the control gear 36, is mounted on and keyed to one end of the shaft 54. A gear 58, mounted on and keyed to the opposite end of shaft 54, is in driving relation with the gear 51.

Figures 3, 4:
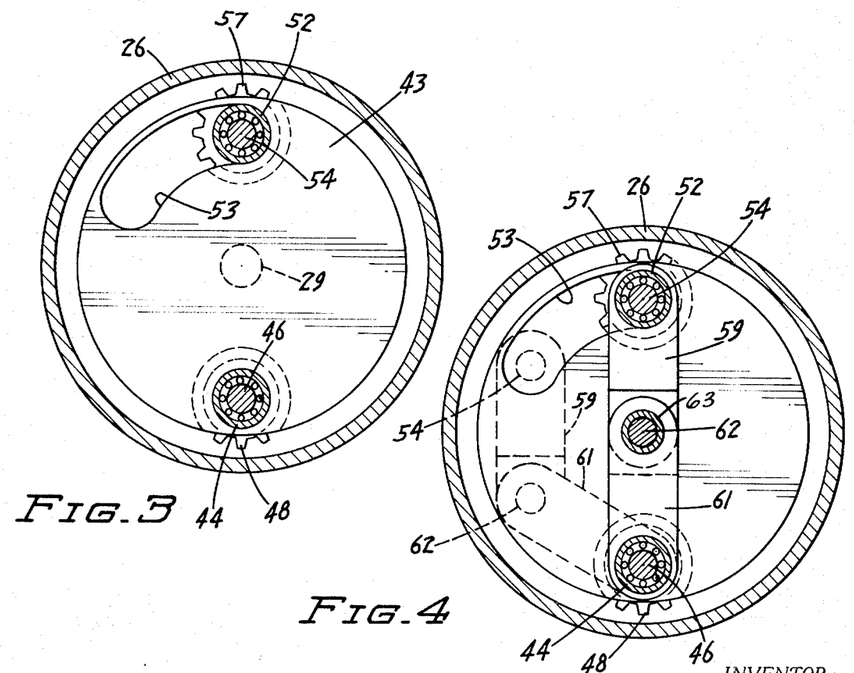
FIG. 3 is a sectional view taken along the line 3—3 of FIG. 2.
FIG. 4 is a sectional view taken along the line 4—4 of FIG. 2.

As shown in FIGS. 2 and 4, a pair of links 59 and 61 extend between sleeves 44 and 52. The inner ends of links 59 and 61 are pivotally mounted on a transverse pin 62. The link 61 has an outwardly directed transverse cylindrical boss 63 accommodating pin 62. The outer end of link 59 has a hole of a size to accommodate sleeve 52 to rotatably mount the link on the sleeve. In a similar manner, the outer end of link 61 has a hole to accommodate the sleeve 44.

The pin 62 is moved to an off-center or eccentric relationship with respect to the axis of rotation of the input shaft 29 in response to rotation of the control gear 36. The movement of the handle 38 will cause control gear 36 to rotate. This will rotate the gears 57 and 58. Rotation of gear 58 will cause movement of gear 51 about the gear 49. Gear 51 moves with respect to the axis of gear 49, thereby moving pin 62 to an offset position. Gear 49, being connected by shaft 46 to gear 48, is maintained in a fixed reference position as gear 48 is positioned in driving engagement with the fixed reference gear 41. The amount of the offset or eccentric position of the pin 62 is determined by the amount of rotation of the control gear 36. The length of slot 53 limits the movement of sleeve 52 and thereby determines the maximum offset of pin 62, shown in broken lines in FIG. 4.

Figures 5, 6, 7, 8, 9:
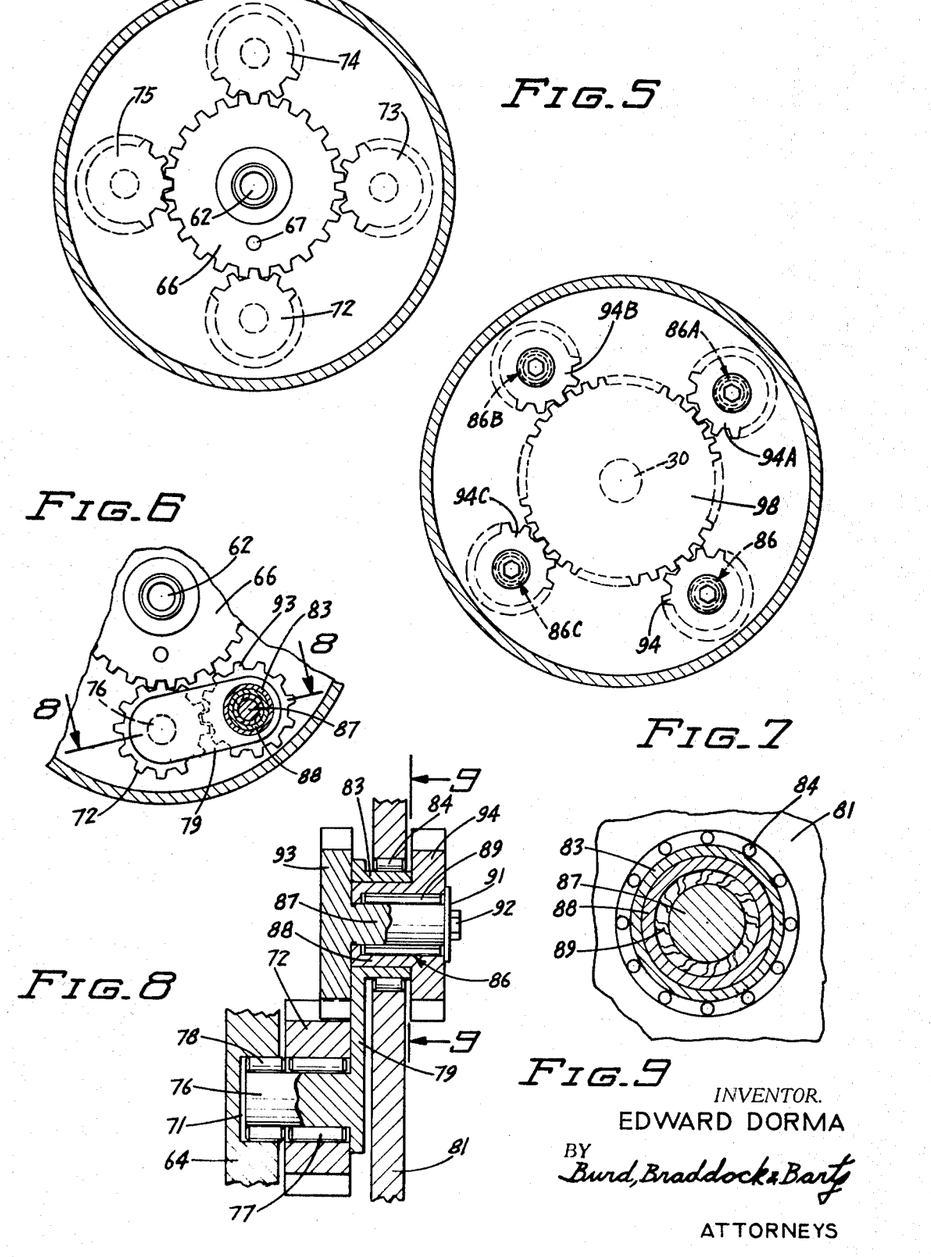
FIG. 5 is a sectional view taken along the line 5—5 of FIG. 2.
FIG. 6 is a sectional view taken along the line 6—6 of FIG. 2.
FIG. 7 is a sectional view taken along the line 7—7 of FIG. 2.
FIG. 8 is an enlarged sectional view taken along the line 8—8 of FIG. 6.
FIG. 9 is an enlarged sectional view taken along line 9—9 of FIG. 8.

Referring to FIGS. 2 and 5, a generally upright wobble plate 64 is positioned adjacent the gear 51. Located along one side of wobble plate 64 is a spur gear 66. The gear 66 is of the same size and diameter as gear 51. A single transverse pin 67 secures the gears 51 and 66 and the wobble plate 64 in concentric alignment with the pin 62. Bearings 68 rotatably mount the gears 51 and 66 and wobble plate 64 on the sleeve 63. A snap ring 69, fitted into a groove in the end of sleeve 63, holds the gears 51 and 66 and wobble plate 64 as a unit on sleeve 63. The side of the wobble plate 64 facing the output shaft 30 has an annular channel or groove 71 substantially concentric with the axis of the pin 62. The channel 71 is located along the outer portion of the wobble plate 64. Four equally spaced gears 72, 73, 74 and 75 are located in driving engagement with the gear 66. Gears 72, 73, 74 and 75 are part of one-way drive units that couple gear 66 with the output shaft 30. The drive units are identical in structure and are circumferentially spaced about the gear 66, as shown in FIG. 5. The one-way drive unit associated with gear 72 is hereinafter described.

Gear 72 has a center opening for accommodating a stub shaft 76. The outer end of shaft 76 projects into groove 71. Bearings 77 rotatably mount the gear 72 on the shaft 76. A separate bearing assembly 78 rotatably positions the outer end of shaft 76 in groove 71. The shaft 76 is secured to an arm 79 located adjacent a transverse wall 81 secured to casing 26. The wall 81 has a center opening 82 providing access to snap ring 69.

Referring to FIGS. 2 and 8, there is shown the one-way drive means that connects the gear 66 with the output shaft 30. The arm 79 has a sleeve 83 directed axially in the direction of the output shaft 30 through an opening in wall 81. A bearing 84, as a roller bearing, rotatably mounts the sleeve 83 on the stationary wall 81. The sleeve 83 has a cylindrical passage carrying a one-way clutch or drive assembly indicated generally at 86. The drive assembly 86 comprises a shaft 87 extended through a collar 88. The collar 88 is rotatably mounted in the sleeve 83. Operatively disposed between the shaft 87 and the collar 88 are a plurality of one-way sprags or dogs 89 operative to effect a one-way drive. The sprags or dogs 89 are clutching elements as a ball and ratchet structure or S-shaped elements circumferentially disposed about the shaft 87, as shown in FIG. 9. Other types of one-way clutch structures can be used to drivably couple the shaft 87 with the collar 88. A washer 91, held on the shaft 87 with a bolt 92, maintains the shaft 87, the collar 88 and sprags 89 in operative assembled relation. A gear 93 is secured to the input end of shaft 87. The gear 93 has external teeth located in driving relation with the teeth on the gear 72. Located on the opposite side of the wall 81 is a gear 94 joined to the collar 88.

Referring to FIGS. 2 and 7, output shaft 30 is rotatably mounted on an outwardly directed cylindrical hub 96 extended from the central portion of the output end plate 28. A plurality of roller bearings 97 rotatably mount the shaft 30 on the hub 96. Secured to the inner end of shaft 30 is a generally upright sun gear 98. Four equally spaced drive gears 94, 94A, 94B and 94C, are positioned about the gear 98. Each of the gears 94–94C is located in driving engagement with the teeth of gear 98. Each gear 94, 94A, 94B and 94C is associated with a one-way clutch or drive assembly, indicated generally at 86, 86A, 86B and 86C. These drive assemblies function to transform and transmit the nutating or eccentric motion of the gear 66 into rotational motion of the gear 98.

In use, when the pin 62 is concentric with or axially aligned with input shaft 29, the transmission is in neutral. The gear 66 is axially aligned with the shaft 29 so that the gears 72, 73, 74 and 75 merely rotate and do not oscillate. Accordingly, the one-way drive assemblies 86, 86A, 86B and 86C do not function to transmit power to the output gear 98.

The power transmitted through the transmission is controlled with hand control 38. Movement of the hand control 38 rotates the control gear 36. Control gear 36 drives the gears 57 and 58. The rotation of gear 58 will angularly move the gear 51 about the gear 49, thereby moving the pin 62 in an offset relationship with respect to the input shaft 29. Movement of the gear 58 is controlled with the sleeve 52 that is movably disposed in the arcuate slot 53. The arcuate length of slot 53 limits the amount of angular movement of the gear 58 and thereby controls the amount of offset of the pin 62. As shown in FIG. 4, the maximum off-center position of the pin 62 is determined by the length of slot 53. The off-center relationship of the pin 62 to the input shaft 29 causes the wobble plate 64 and its associated gear 66 to move in an orbit or eccentric path as it rotates. The amount of eccentric or nutating movement of the gear 66 is determined by the amount of offset of the pin 62 relative to the input shaft 29. The smaller the eccentric movement of the gear 66, the greater the drive ratio between the input shaft 29 and the output shaft 30. Conversely, the greater the eccentric movement of the gear 66, the smaller the drive ratio between the input shaft 29 and the output shaft 30.

Movement of the gears 72, 73, 74 and 75 toward and away from the center line of the input shaft 29 will cause the arm 79 to oscillate or swing back and forth. This actuates the one-way drive assemblies 86, 86A, 86B and 86C.

The amount or degree of angular movement of the arms 79 per revolution of the gear 66 determines the speed of rotation of the output gear 98.

Figure 10:
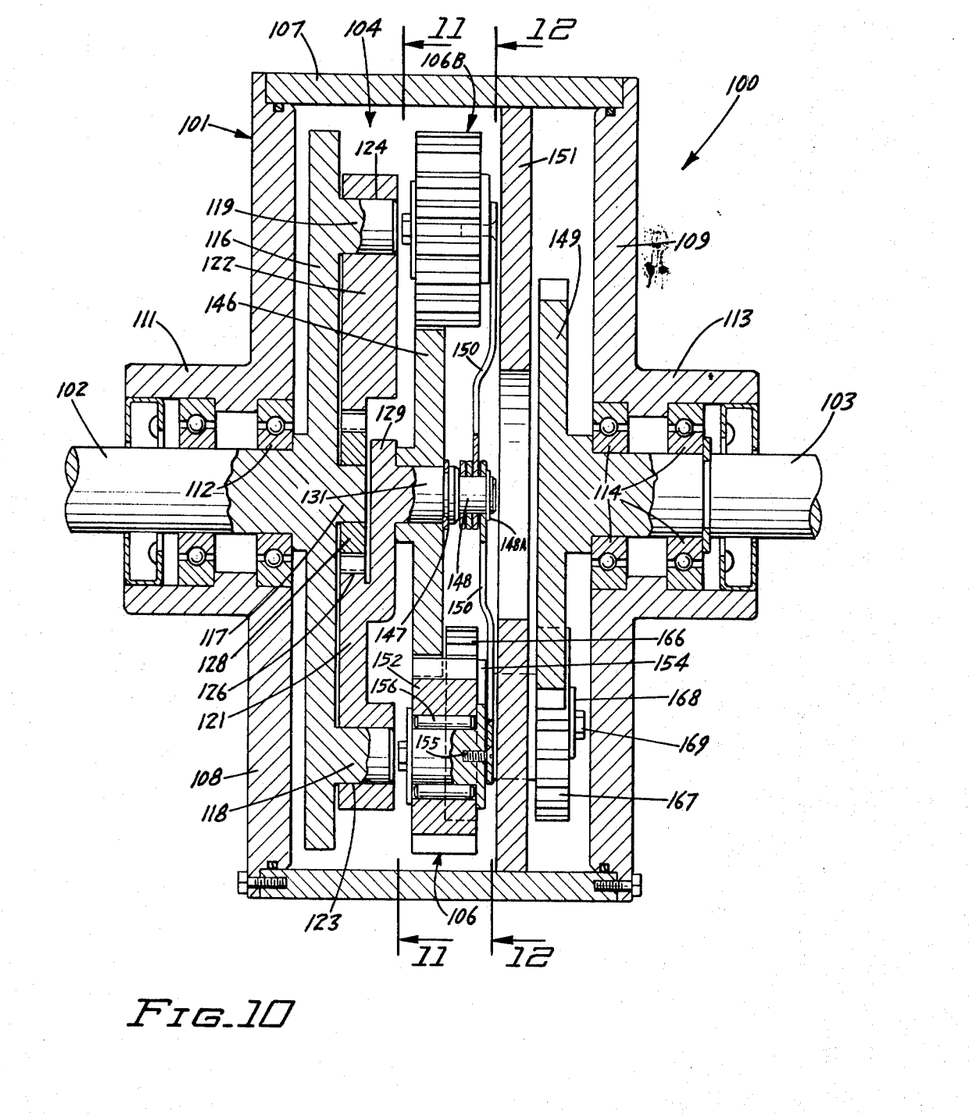
FIG. 10 is a longitudinal sectional view of an automatic variable speed transmission of the invention.

Referring to FIG. 10, there is shown a longitudinal sectional view of an automatic variable speed transmission of the invention indicated generally at 100. The transmission 100 has a housing or casing 101 rotatably carrying an input drive shaft 102 and output driven shaft 103. The output driven shaft 103 is axially aligned with the drive shaft 102. Operatively associated with the input drive shaft 102 is an automatic speed control assembly indicated generally at 104. The speed control assembly 104 operates a plurality of one-way drive assemblies 106, 106A, 106B and 106C which function to transmit power and rotary motion to the output driven shaft 103. The one-way drive assemblies are identical in structure and are identified in FIG. 12 by reference numerals 106, 106A, 106B and 106C.

The housing 101 has an outer cylindrical wall 107 carrying an input end plate 108 and an output end plate 109. Input end plate 108 has an outwardly directed tubular hub 111 carrying bearings 112 which rotatably support the shaft 102. The output end plate has an outwardly directed cylindrical hub 113 carrying bearings 114. Output shaft 103 is rotatably mounted on the bearings 114.

Figures 11, 12, 13:
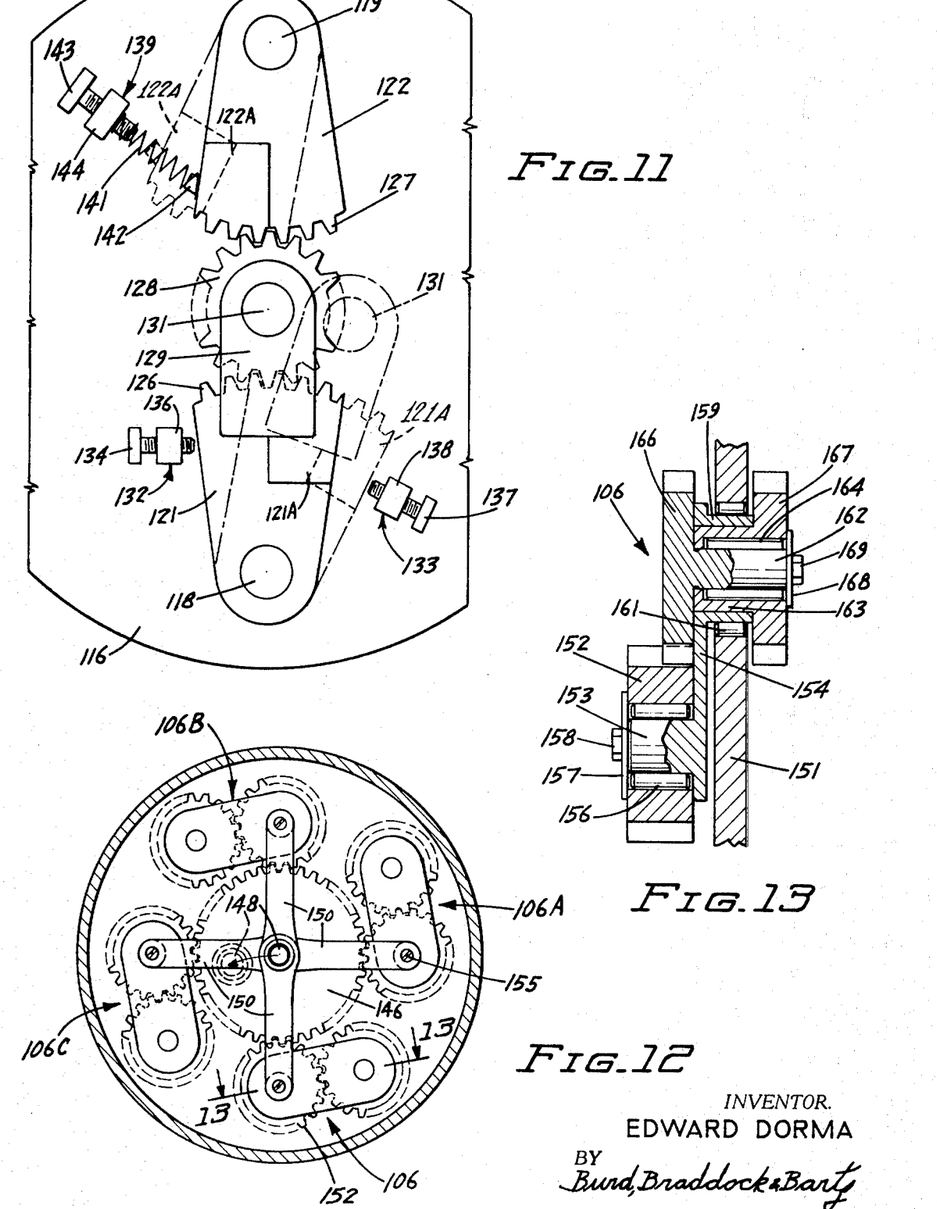
FIG. 11 is a sectional view taken along line 11—11 of FIG. 10.
FIG. 12 is a reduced scale sectional view taken along line 12—12 of FIG. 10.
FIG. 13 is an enlarged sectional view taken along line 13—13 of FIG. 12.

Secured to the inner end of input shaft 102 is a transverse member 116, shown as a disc or circular plate. The center portion of the plate 116 has an inwardly directed cylindrical stub, axle or projection 117 that is axially aligned with the central longitudinal axis of the shaft 102. Diametrically opposite outer portions of the disc 116 have inwardly directed axial pivot members or axles 118 and 119. The pivot members 118 and 119 have outer cylindrical surfaces that are parallel to the axis of rotation of the shaft 102. A first control member 121, in the form of a link or arm, is pivotally mounted on the pivot member 118. The outer portion of the control member 121 has a bore 123 to pivotally mount the member on the pivot 118. A second control member 122, in the form of an arm or link, has a bore 124 in the outer portion thereof to pivotally accommodate the pivot member 119. As shown in FIG. 11, extended along the arcuate inner portion of the first control member 121 is an arcuate gear segment 126. The control member 122 has a similar gear segment 127 along its arcuate inner portion. An external spur gear 128 rotatably mounted on the axle 117 has teeth in driving engagement with the gear segments 126 and 127 to operatively and drivably connect the first control member 121 and the second control member 122.

Returning to FIG. 10, control member 121 has an offset finger or member 129 projected radially inwardly. An axially projected member or pin 131 is secured to the inner end of finger 129. The pin 131 is a cylindrical member that is positionable concentric with the longitudinal axis of rotation of the input shaft 102. The pin 131 is movable toward and away from the axis of rotation of the shaft 102 in response to the torque and speed applied to the transmission.

As shown in FIG. 11, the control member 121 has an enlarged portion or weight 121A along one side thereof. The control member 122 has a similar enlarged portion or weight 122A on one side thereof. The portions 121A and 122A balance each other and serve as weights which move outwardly as the disc 116 rotates. The speed of rotation of the disc 116 determines the centrifugal force developed by the weights 121A and 122A. The amount of angular movement of the control member 121 is controlled by a pair of stops 132 and 133. Stop 132 comprises a bolt 134 threaded through a projection or member 136 secured to the side of plate 116. The stop 133 is of similar construction and comprises a bolt 137 threaded through a projection or abutment 138 secured to the side of disc 116. The bolts 134 and 137 are adjustable so that the amount of angular movement of the control member 121 can be varied. The control member 122 moves outwardly toward a stop 139 secured to plate 116. Spring 141, or similar biasing structure, is positioned between stop 139 and the control member 122. The spring fits over a short nipple, ear or tab 142 on the side of control member 122 and a bolt 143 threaded through a projection or abutment 144 secured to the side of plate 116. The spring 141 serves to bias the control members 121 and 122 toward the neutral position wherein the pin 131 is axially aligned with the axis of rotation of the input shaft 102.

A spur gear 146 is rotatably positioned on the pin 131. Mounted on the outer end of pin 131 is a snap ring 147 that maintains the gear 146 in assembled relation with the pin 131. Pin 131 has an axial extension 148 pivotally carrying a plurality of links 750. The links 150 maintain the one-way drive assemblies 106, 106A, 106B and 106C in engagement with gear 146. Each link 150 has an inner end pivotally mounted on extension 148 and an outer end pivoted to a transverse arm 154. A snap ring 148A on extension 148 holds the links 150 in assembled relation with the extension. A fastener, as a bolt, rivet, or the like, 155 pivotally connects the link 150 to the arm 154. Links 150 can be replaced with a wobble plate, similar to plate 64 shown in FIG. 2. The wobble plate is mountable on pin 131 between gear 146 and control members 121 and 122. Other types of linkages and structures can be used to hold gears 152 in driving engagement with gear 146.

The one-way drive assemblies 106, 106A, 106B and 106C transmit power and drivably connect the gear 146 with a gear 149 mounted on the inner end of driven shaft 103. The gear 149 is located outside a transverse stationary wall 151 secured to the cylindrical wall 107 of the housing.

Referring to FIG. 13, there is shown the detailed construction of the one-way drive assembly 106. Drive assemblies 106A, 106B and 106C are identical in structure.

Drive assembly 106 has a first spur gear 152 mounted on a stub shaft 153. A transverse arm 154 is secured to the stub shaft and extends generally parallel to the wall 151. A first one-way drive unit or mechanism 156, as dogs, sprags, rollers, balls, and the like, drivably couples the gear 152 to the shaft 153 so that the gear 152 is only free to rotate in one direction. A washer 157 and bolt 158, secured to the shaft 153, hold the gear and one-way drive mechanism in assembled relation with the shaft 153.

Projected axially from the inner end of arm 154 is a sleeve 159. The sleeve 159 extends through a hole in the wall 151 and is rotatably mounted thereon with bearings 161. Extended through the sleeve 159 is a shaft 162 and a collar 163. Collar 163 telescopes over shaft 162. A second one-way drive mechanism 164, as dogs, sprags, rollers, balls, and the like, drivably couples the shaft 162 with the collar 163. The first one-way drive unit 156 drives in a direction opposite of the drive of the second one-way drive unit. Secured to the shaft 162 is a second gear 166. The second gear 166 has external teeth in driving engagement with the gear 152. A third gear 167 is mounted on the outer side of the collar 163. The second gear 166 has external teeth in driving engagement with the teeth on the gear 149. A washer 168 and bolt 169 threaded into the end of shaft 162 hold the collar 163 and one-way drive mechanism 164 in assembled relation with the shaft 162.

In use, the speed control assembly 104 is operative to automatically adjust, without outside or manual means, to an infinite drive ratio below a given speed. Also, the control assembly 104 operates to vary the drive ratio to maintain a substantially constant engine speed as the load on the transmission varies. The speed of rotation of the disc 116 determines the angular positions of the control members 121 and 122. As the speed of rotation of disc 116 decreases, the spring 141 will bias the control members 121 and 122 toward their central position. This moves the pin 131 toward the axis of rotation of the input shaft 102. As the pin 131 moves toward the concentric relationship with the axis of rotation of the input shaft 102, the amount of eccentric or nutating motion of the disc 146 is decreased. This increases the drive ratio of the transmission, thereby decreasing the speed of rotation of the driven shaft 103. As the speed of the input shaft 102 increases, the control members 121 and 122 move to their outermost positions as the centrifugal forces acting on the weights 121A and 122A of the control members move them in opposite outward directions, as shown in broken lines in FIG. 11. This moves the pin 131 into an eccentric or off-center relationship with respect to the axis of rotation of the input shaft 102. The amount of offset of the pin 131 determines the degree of eccentric or nutating motion of the gear 146.

Referring to FIG. 12, as the gear 146 nutates, it will cause the gear 152 of the one-way drive assembly 106 to sequentially lock and unlock as the gear 146 moves in its eccentric path. The eccentric motion of the gear 146 will angularly move the arm 154 and thereby operate the one-way drive mechanism 164. This drive works in conjunction with the one-way mechanism 156 to transmit power from the gear 146 to the gear 149. The lock and unlock drive directions of the one-way drive mechanisms 156 and 164 are shown in FIG. 12. The speed of rotation of the gear 149 is determined by the amount of nutating or eccentric motion of the gear 146.

Several embodiments of the variable speed transmission have been shown and described. Changes in structure may be made without departing from the invention. For example, the bearings 77 in FIG. 2 may be replaced with one-way drive members, sprags, rollers and the like, as shown at 156 in FIG. 13. When this is done, gear 66 is released from pin 67 so that it is free to rotate on sleeve 63. The two one-way drive or clutch members cooperate to transmit power from nutating gear 66 to driven gear 98 in the manner similar to the functioning of one way drive mechanism 106. The drive mechanism 106 is shown in detail in FIG. 13.

The embodiments of the invention in which an exclusive property or privilege is claimed are defined as follows:

1. A variable speed transmission comprising: a housing, an input drive means rotatably mounted on said housing, an output driven means rotatably mounted on said housing, eccentrically movable means movable transversely of the axis of rotation of the input drive means, first drive means connecting the eccentrically movable means with the input drive means to rotate the movable means, said first drive means having control means operable to vary the eccentric position of the eccentrically movable means, and second drive means including one-way drive means drivably coupling the eccentrically movable means with the output drive means in a drive ratio dependent on the eccentric position of the eccentrically movable means.

2. The transmission of claim 1 wherein: the eccentrically movable means includes external gear means, said first drive means and control means having a gear means located in driving engagement with the external gear means.

3. The transmission of claim 1 wherein: the input drive means comprises a drive shaft and plate means attached to the drive shaft; said first drive means having first gear means and second gear means journaled on said plate means, a stationary gear, said first gear means drivably coupled to the stationary gear and eccentrically movable means, said second gear means drivably coupled to a portion of the control means and the eccentrically movable means, said plate means having an arcuate slot for movably accommodating the second gear means whereby on movement of the control means the second gear means operates to move the eccentrically movable means relative to the axis of rotation of the input drive means.

4. The transmission of claim 3 including: a plurality of link means pivotally mounted on the plate means generally concentric with the axes of rotation of the first gear means and the second gear means, said link means having adjacent end portions pivotally joined together about an axis extended generally parallel to the axis of rotation of the input drive shaft, said eccentrically movable means being mounted on the link means generally concentric with the pivot axis at the adjacent end of the link means.

5. The transmission of claim 3 wherein: said portion of the control means comprises a gear means rotatable generally concentric with the input drive shaft.

6. The transmission of claim 1 wherein: the eccentrically movable means comprises a wobble plate, a first external gear on one side of the plate and a second external gear on the other side of the plate, means securing the wobble plate and first and second external gears together, and means to support and rotatably mount said wobble plate on the input drive means.

7. The transmission of claim 6 wherein: the means to support and rotatably mount said wobble plate includes a plurality of link means pivotally joined together.

8. The transmission of claim 1 wherein: the control means includes a manually movable means operable to vary the eccentric position of the eccentrically movable means.

9. The transmission of claim 1 wherein: the control means includes a speed control assembly responsive to the speed of the input drive means to control the drive ratio of the transmission in a manner to substantially maintain a predetermined speed of the input drive means.

10. The transmission of claim 1 wherein: the control means comprises a speed control assembly having a plurality of movable members, means movably mounting the movable members on the input drive means whereby the members change positions in response to the speed of rotation of the input drive means, at least one of said movable members having means which selectively move toward and away from the axis of rotation of the input drive means as said members change positions, said eccentrically movable means being mounted on said means on the movable members.

11. The transmission of claim 10 including: gear means drivably connecting the movable members.

12. The transmission of claim 10 wherein: the movable members are weight members pivotally mounted on the input drive means.

13. The transmission of claim 10 wherein: the eccentrically movable means is an external gear mounted on said means on one of the movable members.

14. The transmission of claim 10 including: means to bias the movable members toward the axis of rotation of the input drive means.

15. The transmission of claim 9 wherein: the one-way drive means comprise a first one-way drive mechanism and a second one-way drive mechanism coordinated with each other to transmit power from the eccentrically movable means to the output driven shaft.

16. A variable speed transmission comprising: a housing, an input drive shaft rotatably mounted on the housing, an output driven shaft rotatably mounted on the housing, an output gear secured to the output driven shaft, plate means secured to the input drive shaft, first gear means rotatably mounted on the plate means outwardly of the axis of rotation of the input drive shaft, reference gear means fixed to the housing, an external gear means movably associated with said plate means, said first gear means positioned in driving engagement with the reference gear means and external gear means, second gear means circumferentially movable and rotatable on said plate means, control gear means rotatably mounted on said housing, said second gear means positioned in driving engagement with the external gear means and control gear means whereby rotation of the control gear means moves the external gear means transversely of the axis of rotation of the input drive shaft to offset the axis of rotation of the external gear means relative to the axis of rotation of the input drive shaft, drive means including one-way drive mechanisms drivably coupling the external gear with the output gear to transmit power from the external gear to the output drive gear in a drive ratio dependent on the amount of offset of the axis of the external gear means relative to the axis of rotation of the input drive shaft.

17. The transmission of claim 16 wherein: the plate means has a circumferential slot, said second gear means including a sleeve member positioned in said slot for circumferential movement relative to said plate means in response to operation of the control gear means.

18. The transmission of claim 16 wherein: the drive means includes a second external gear fixed to the external gear means, said one-way drive mechanisms including a plurality of one-way drive units positioned in operative engagement with said second external gear and the output gear to transmit power from the second external gear to the output gear in response to eccentric motion of the second external gear, said one-way drive mechanisms operable to provide a drive ratio dependent upon the amount of offset of axis of the external gear means relative to the axis of rotation of the input drive shaft.

19. The transmission of claim 16 wherein: the drive means comprises a wobble plate, a second external gear on one side of the plate, said first external gear being on the opposite side of the plate, means securing the wobble plate and first and second external gears together, and means to support and rotatably mount said wobble plate and said first and second external gears on the first gear means and second gear means.

20. The transmission of claim 19 wherein: the means to support and rotatably mount said wobble plate and first and second external gear means includes a plurality of link means pivotally joined together.

21. The transmission of claim 16 including: a plurality of link means pivotally mounted on the plate means generally concentric with the axes of rotation of the first gear means and the second gear means, said link means having adjacent end portions operably coupled together, means mounting said external gear means on at least one of said link means.

22. A variable speed transmission comprising: a housing, an input drive means rotatably mounted on said housing, an output driven means rotatably mounted on said housing, a speed control assembly drivably connected to said input drive means and rotatable therewith, said speed control assembly having at least one member that moves in response to the speed of the input drive means, said one member having on a portion that moves toward and away from the axis of rotation of the input drive means in response to the movement of the member, a gear mounted on said portion, said gear having eccentric movement when the portion is spaced from the axis of rotation of the input drive means, drive means including one-way drive means drivably coupling the gear with the output driven shaft in a drive ratio dependent on the eccentric position of said gear.

23. The transmission of claim 22 wherein: the input drive means includes a plate means, said control assembly having a first member pivotally mounted on an outer portion of the plate means and a second member pivotally mounted on another outer portion of the plate means, means drivably connecting the first member with the second member, said first member having a portion that moves toward and away from the axis of rotation rotation of the input drive means in response to pivotal movement of said first member.

24. The transmission of claim 23 wherein: said means drivably connecting the first member with the second member comprises gear means rotatably mounted on a central portion of the plate means.

25. The transmission of claim 23 including: means to bias the first member and second member in a direction to move the portion toward the axis of rotation of the input drive means.

26. The transmission of claim 22 wherein: the one-way drive means comprise a first one-way drive mechanism and a second one-way drive mechanism coordinated with each other to transmit the power from the eccentrically movable gear to the output driven means.

* * * * *